United States Patent Office 3,014,065
Patented Dec. 19, 1961

3,014,065
PROCESS OF MAKING METHACRYLATES OF ALIPHATIC HEAVY ALCOHOLS
Bernard Chatelin, Villers-Saint-Sepulcre, and Jacques Modiano and Francis Weiss, Pierre-Benite, France, assignors to Societe d'Electro-Chimie d'Electro-Metallurgie et des Acieries Electriques d'Ugine, Paris, France, a corporation of France
No Drawing. Filed Mar. 15, 1960, Ser. No. 15,054
Claims priority, application France Mar. 16, 1959
10 Claims. (Cl. 260—486)

This invention relates to the process of making methacrylates of aliphatic heavy alcohols.

The first object of the invention is a process of making, starting from acetone cyanhydrin, methacrylates of primary aliphatic heavy alcohols comprising 8 to 18 carbon atoms.

A second object of the invention is to separate the methacrylates of primary aliphatic heavy alcohols from their mixtures with the corresponding heavy alcohol in excess, whatever the process of manufacture of such mixtures may be.

The technique utilized for the preparation of the lower methacrylic esters, in particular, of the methyl methacrylate, consists in heating the product of a primary reaction between acetone cyanhydrin and pure sulphuric acid with an excess of water and methanol, then in collecting by distillation the resulting product which contains the formed methacrylic ester mixed with alcohol and water. But this technique cannot be applied to the making of esters of non-volatile heavy alcohols under the usual conditions of operation. As a matter of fact, the temperatures which should be reached to separate these esters from the reactive mixture by distillation are above 180–200° C., even when working under reduced pressure, and then a total degradation of the products occurs under the action of the sulphuric acid present.

The technique called transesterification is then generally used, this method comprising heating the heavy alcohol with an excess of methyl methacrylate, in the presence of a catalyst of esterification. Then a chemical equilibrium occurs, leading to the formation of methanol and methacrylate of heavy alcohol. The displacement of the equilibrium in the required direction is obtained due to the elimination of methanol by azeotropic distillation with a part of methyl methacrylate.

But this process has a certain number of disadvantages. The reaction requires a substantial excess of methyl methacrylate, amounting to about 3 times the theoretical amount, in order to have a high rate of transformation of the heavy alcohol. Nevertheless, the duration of the reaction is long and generally above 5 hours.

In the course of this long reaction, a partial polymerization, which affects in particular the methyl methacrylate, cannot practically be avoided. Important disadvantages result therefrom: lowering of the yield of transformation of the methyl methacrylate, which is the more important as this latter is in great excess, and considerable difficulties on purifying the methacrylate of the heavy alcohol (elimination of the catalyst, distillation).

On the other hand, the elimination of the unconverted heavy alcohol, by fractional distillation, and the final distillation of the ester, in the presence of polymerized residues, constitute difficult problems owing to the slight difference between the boiling points of the alcohol and of the corresponding ester, as also of the required high temperatures and low pressures.

The general management of the process is then affected a great deal both by the relatively high consumption of expensive raw materials and by the heavy cost of transformation.

The present invention enables us to overcome these difficulties and to obtain methacrylates of primary aliphatic heavy alcohols comprising 8 to 18 carbon atoms following easy operations and under particularly advantageous economic conditions.

It relates to:

(a) A process of making such methacrylates which consists, in a first step, in mixing with the crude solution of methacrylamide, obtained by transformation in sulphuric medium of acetone cyanhydrin, proper amounts of water and primary aliphatic heavy alcohol comprising 8 to 18 carbon atoms, then in separating an organic phase containing, with the formed methacrylate of heavy alcohol, methacrylic acid and the unconverted heavy alcohol, and an aqueous phase containing sulphuric acid, ammonium sulphate and some by-products, in a second step, in carrying out in this organic phase the esterification of the free methacrylic acid by the heavy alcohol present and the transformation of the excess heavy alcohol into acid sulphate of heavy alcohol due to a calculated addition of sulphuric acid and, in a third step, in separating at last the methacrylate of heavy alcohol from the foreign substances, by washing said phase with an aqueous solution of an organic solvent miscible with water which dissolves the acid sulphate.

(b) The application of the treatment of the organic phase described in the second and third steps, to the separating of the same methacrylates of primary aliphatic heavy alcohols from their mixtures with the corresponding heavy alcohol whatever the elaboration process of such mixtures may be.

The proportions of the reagents to be used in the first step are advantageously included between 0.75 to 1.5 mols of alcohol and 2 and 7 mols of water (preferably between 3 and 6) for 1 mol of initial acetone cyanhydrin.

The molar amount of sulphuric acid to be used in the second step corresponds substantially to the molar amount of alcohol present.

The organic solvent-water mixture to be used in the third step is such that the acid sulphate of heavy alcohol be soluble therein and the methacrylate of heavy alcohol nearly insoluble. The concentration of organic solvent in the solvent-water mixture is advantageously included between 20 and 50% by weight.

The quantity of solvent-water mixture to be used is included preferably between 0.5 and 3 times the weight of the organic phase to be treated.

The process will be described in detail in the following non-limiting examples which relate to the production of lauryl methacrylate or stearyl methacrylate.

It is known that lauric alcohol is n-dodecanol $C_{12}H_{25}OH$, but the technical product obtained by hydrogenation of coconut oil is a mixture of primary straight chain alcohols constituted by about 70–80% n-dodecanol, 20–30% n-tetradecanol and containing generally small amounts of n-decanol and n-hexadecanol.

The lauric alcohol, which will be referred to in the course of the specification, will be, except as otherwise stated, constituted by this mixture.

The transformation of acetone cyanhydrin by heating with an excess of sulphuric acid is a well known operation. It is known that it leads essentially to the formation of methacrylamide which is dissolved in the sulphuric medium in the free or combined state. When this mixture is heated, after having been diluted with an excess of water, the methacrylamide hydrolyzes into methacrylic acid, but applicants have noted the surprising fact that, when the hydrolysis operation is carried out in the presence of heavy alcohol, for instance lauric alcohol, this latter, although it is nearly totally insoluble in the medium, esterifies very rapidly up to a high value of chemical equilibrium in contact with the aqueous phase.

It is remarkable to note that this equilibrium is reached after a duration of contact which does not go beyond that which is required for the completion of the methacrylamide hydrolysis and which is consequently much shorter than that which could be foreseen, taking into account the heterogeneousness of the medium.

At the end of the operation, an heterogeneous system is obtained, which consists of two liquid phases: an organic light phase constituted by the lauryl methacrylate, by lauric alcohol which has not reacted, and by almost all of the free methacrylic acid left; and an aqueous phase containing the sulphuric acid and the ammonium sulphate, this latter coming from the hydrolysis of the amide, together with some organic by-products.

The initial crude solution can be obtained according to well known processes, for example, by the addition of acetone cyanhydrin to an excess of 100% sulphuric acid (for example, 1.5 mols of acid per 1 mol of cyanhydrin) at 75–100° C., followed by keeping the mixture at 125–130° C. for a sufficient time.

The addition of water to the so-obtained mixture to carry out the esterification of the first stage has a double object: that of accelerating the hydrolysis of the methacrylamide, then of reducing the duration of the reaction, and that of permitting an almost quantitative separation of all of the organic products in a light phase, by dilution of the sulphuric aqueous phase.

It is known, as a matter of fact, that generally the amide hydrolysis by the aqueous sulphuric acid is all the more rapid as this latter is more diluted. The suitable amount of water is generally included between 2 and 7, preferably between 3 and 6 mols for 1 mol of initial acetone cyanhydrin. When less than 3 mols are used, the aqueous phase remains relatively concentrated in sulphuric acid at the end of the reaction, as is shown by the presence in this latter of a certain amount of acid lauryl sulphate formed by the action of the sulphuric acid on the lauric alcohol in this same phase and it follows that the separation of the organic products by decantation is incomplete in some cases.

If, for example, 7 mols are used, the increase of the hydrolysis speed owing to the dilution becomes very slight and the esterification reaches less high limits.

Water has another important effect. By acting on the concentration of the aqueous phase in sulphuric acid and ammonium sulphate, it fixes the boiling temperature of the system. In case 6 mols of water and 1.5 mols of sulphuric acid are used for 1 mol of acetone cyanhydrin, the boiling temperature is 115–120° C. At this moderate temperature, the esterification is rapid and requires only 2½ to 4 hours to be completed and the risks of corrosion or of polymerization are small. At last, there is no risk of charring the organic reagents by the sulphuric acid, as usually occurs in the manufacture of lower esters, in which the satisfactory exhausting of the sulphuric phase by distillation requires high temperatures ranging about 130–150° C. This charring is accompanied by a release of sulphurous gas which is a frequent cause of accidental polymerization of the methacrylic ester in the course of the manufacture.

The amount of alcohol to be used in the first step can vary to a large extent.

As a matter of fact, the proportion of acetone cyanhydrin transformed into lauryl methacrylate when the balance is reached is nearly independent of the amount of lauric alcohol used. This is due very likely to the fact that the alcohol is not soluble in the methacrylamide aqueous solution and that it esterifies progressively by means of a small amount of acid lauryl sulphate, which passes into the aqueous phase and which is renewed as it is used up.

It is, however, preferable to employ it in nearly stoichiometric amounts, for example 0.75 to 1.5 mols of lauric alcohol for 1 mol of acetone cyanhydrin.

The rates of transformation into lauryl methacrylate and of extraction of the methacrylic acid by the organic layer are very high. So it is that, when the equilibrium is reached, the phase of crude ester, which decants in the reactive mixture, contains, in relation to the initial molar amount of acetone cyanhydrin, 75 to 85% lauryl methacrylate and 7 to 12% methacrylic acid, the total yield being 87 to 95%. As the yield of the transformation of the acetone cyanhydrin into methacrylamide does not generally go beyond 94 to 96%, it can be considered that the yield of recovery of the methacrylamide in the form of methacrylic acid and ester, according to the process of the invention, is nearly quantitative. Likewise, when the amount of water is judiciously selected, for example 6 mols for 1 mol of cyanhydrin, more than 98% of the initial lauric alcohol is in the organic layer in the state of free alcohol or of methacrylic ester.

The organic light layer obtained at the end of the first step, which will be called "crude ester," contains then, as stated above, in addition to the lauryl methacrylate, a certain amount of free methacrylic acid and also of the unconverted heavy alcohol.

In the process according to the invention, the transformation of the free methacrylic acid contained in the crude ester into lauryl methacrylate and the separation of the possible remaining lauric alcohol contained in this latter are obtained in a very simple way, particularly efficient in the second step, by heating, as also indicated hereabove, the crude ester with a certain amount of concentrated sulphuric acid.

By its well known catalytic action, the sulphuric acid permits the total esterification of the free methacrylic acid by a stoichiometric amount of lauric alcohol and on the other hand it reacts on the possible excess alcohol to give acid lauryl sulphate.

The crude ester is then treated with an amount of sulphuric acid required for these two reactions. In practice, it is enough to add a mol amount of acid nearly equal to the mol amount of alcohol present in the crude ester. In the beginning, the mixture of concentrated sulphuric acid and of crude ester is homogeneous; then the water formed in the two reactions of esterification separates in a distinct layer, carrying along a certain amount of sulphuric acid. This does not impede the carrying out of the process, but this aqueous separation can be avoided by utilizing oleum instead of the concentrated sulphuric acid, so as to fix the water formed and maintain the homogeneity of the medium.

The duration and the temperature of the reaction are not critical. For one's guidance, it is possible to work between 40 and 120° C. for half an hour to one hour.

The mixture of lauryl methacrylate and of acid lauryl sulphate thus obtained and possibly containing small amounts of sulphuric acid and water separates very easily, in a third step, by liquid-liquid extraction by utilizing the great solubility of the acid lauryl sulphate in solvent-water mixed solutions in which the lauryl methacrylate is nearly insoluble. The solvents to be used must merely be miscible with water.

The nature of the solvent is of no particular importance, its part being merely to ensure a better solubilization of the acid lauryl sulphate in water. The simplest and cheapest ones are methanol or ethanol; another solvent miscible with water, such as acetone, suits quite as well.

The separation of the lauryl methacrylate in a third step according to the invention is then carried out by treating the final mixture resulting from the action of the sulphuric acid on the crude ester, by a solvent-water mixture defined herebefore under the usual conditions of extraction: in counterflow, in a column or in mixers-decanters, discontinuously by successive washings, etc.

Thus, the acid lauryl sulphate is perfectly solubilized and less than 10% of the lauryl methacrylate is dissolved in the aqueous extract. The facility of extraction is illustrated by the fact that a mere stirring of the mixture to be treated with the solvent-water mixture can extract 80–90% of the acid lauryl sulphate.

The so-obtained lauryl methacrylate generally contains a little solvent which is easily eliminated by distillation or by entraining it by means of a gas current.

After this operation, the purified product contains more than 95% lauryl methacrylate and can be used without any other treatment in its usual applications. It is also possible, if necessary and desirable, to subject it to a decoloration treatment on active carbon or on absorbent earths.

A second example of carrying out the process according to the invention relates to the manufacture of stearyl methacrylate.

The technical stearic alcohol utilized in this example is a technical product whose approximate composition by weight is as follows: 40% n-hexadecanol, 60% n-octadecanol; its average molecular weight is then equal to 259. In the following description, the term stearyl methacrylate will apply to the ester mixture resulting from the esterification of this technical alcohol and having an average molecular weight of 327.

As in the preceding example, the methacrylamide hydrolysis is carried out in a first step in the presence of the technical stearic alcohol.

At the end of the operation, there are obtained two separate liquid phases: an organic light phase constituted by the stearyl methacrylate, the stearic alcohol in excess and free methacrylic acid having not reacted; a heavy aqueous phase containing sulphuric acid, ammonium sulphate and some by-products.

In a second step, the crude ester is treated with a proper amount of sulphuric acid, the object of this operation being to esterify the free methacrylic acid by the stearic alcohol, which are both contained in said ester and to transform the excess of alcohol into acid stearyl sulphate.

In a third and last step, there is separated the stearyl methacrylate formed in the two preceding steps by addition of an aqueous solution having a concentration of 40% methanol, in amount corresponding to about twice the weight of mixture to be treated.

There is thus obtained, after removing of the head products, a product containing 95% stearyl methacrylate which can be used without any other treatment or after decoloration on active carbon.

The recovery of the products contained in the solvent-water extract is very simple. The organic solvent is removed by distillation and at the bottom of the distillation apparatus the water and the insoluble heavy organic products are drawn off; they are separated afterwards by decantation.

The organic layer, mainly composed of acid lauryl sulphate or of acid stearyl sulphate and of lauric or stearic alcohol coming from the hydrolysis of the sulphates during the distillation, and also of lauryl methacrylate or of stearyl methacrylate in small amounts, can be recycled without any other treatment to the esterification.

The process according to the invention allows also, independently of their process of manufacture proper, to separate the methacrylates of aliphatic heavy alcohols from their mixtures with the corresponding excess heavy alcohol according to the above second and third steps. It is so when the methacrylate of heavy alcohol is prepared in a known manner, either by esterification of methacrylic acid, or by transesterification of the methyl methacrylate.

The process according to the invention can be carried out discontinuously or continuously. In this latter case, a succession of stirred reactors can be used. The first of them is fed with the sulphuric methacrylamide obtained in a first step, water and heavy alcohol, flowing therein by gravity. After having remained in this first reactor during the required time, the reagents pass into the following one. The number of successive reactors can vary, but 3 or 4 reactors are generally adopted.

The residence time in the whole of the reactors is so selected that it be at least sufficient to hydrolyze all of the methacrylamide. The reactive mixture coming out of the last reactor is led into a decanter in which the separation of the phases is made in a few minutes.

The economical interest of the process is considerable since it leads to a very high yield of lauryl methacrylate and of stearyl methacrylate corresponding to 87–95% of the acetone cyanhydrin used, while avoiding passing through the medium of the light methacrylic ester with all of the disadvantages mentioned hereinabove.

The following examples give the results obtained in the making of lauryl and stearyl methacrylates.

*Example 1*

86 g. of acetone cyanhydrin at 98.5% (1 mol) were progressively poured, while stirring, into 147 g. of 100% sulphuric acid, while maintaining the temperature at about 95° C. Then the mixture was brought to 130° C. during half an hour to one hour. In the so-obtained mixture, 94% of the initial acetone cyanhydrin was in the form of methacrylamide.

225 g. of this mixture (corresponding to 0.96 mol of initial acetone cyanhydrin) were mixed with 108 g. of water (6 mols) and 193 g. of technical lauric alcohol (composed of 69–70% n-dodecanol, about 29–30% n-tetradecanol and about 1% n-decanol, having an average molecular weight of 193). The mixture was heated and strongly stirred for 3 to 4 hours at the boiling temperature, i.e., 116–122° C. Then the hot mixture was decanted to collect 244 g. of a supernatant organic phase which contained, by weight, 86.7% lauryl methacrylate (of average molecular weight equal to 261), 2.3% methacrylic acid and about 11% lauric alcohol. Thus, in this phase, 85% of the initial acetone cyanhydrin was obtained in the form of lauryl methacrylate and nearly 7% in the form of methacrylic acid. On the other hand, more than 95% of the alcohol, by weight, was in this phase in the free or esterified state.

*Example 2*

An esterification operation was carried out under conditions identical with those of Example 1, but utilizing only 54 g. of water (3 mols). The mixture was heated at about 120° C. for 4 hours. The collected layer of crude ester weighed 225 g. and had the following composition by weight:

| | Percent |
|---|---|
| Lauryl methacrylate | 89.3 |
| Methacrylic acid | 0.96 |
| Lauric alcohol | 7.5 |
| Acid lauryl sulphate, about | 2 |

The recoveries, on the whole, were lower than in Example 1, being 80.7% of the initial acetone cyanhydrin in the form of lauryl methacrylate and 2.6% in the form of methacrylic acid and 87.5% of the lauric alcohol in the free or esterified state.

*Example 3*

253 g. of a crude ester obtained under conditions similar to those of Example 1 and whose composition by weight was as follows:

| | Percent |
|---|---|
| Lauryl methacrylate | 78 |
| Methacrylic acid | 3.25 |
| Lauric alcohol | 18 | were mixed with 25.3 g. of 100% sulphuric acid. The mixture was heated for half an hour at 110° C. After decanting, there were separated 7.4 g. of a sulphuric aqueous phase containing 67% $H_2SO_4$ and 270 g. of an organic phase which was treated, a first time, by stirring with 510 g. of an aqueous solution containing 40% by weight of methanol. After decanting, two layers were obtained. The layer containing the ester was washed a second time with 105 g. of the same solvent. The final ester contained 0.6% methacrylic acid and 3% methanol. After elimination of this latter by distillation, there remained 197.3 g. of lauryl methacrylate having a purity of 95–98%.

The washing solutions were combined and the methanol was recovered from them by distillation. By decanting the hot residue, there was collected at the foot of the column an organic layer weighing 64 g. and having the following composition by weight: lauryl methacrylate 42.5%, lauric alcohol free or in the state of acid lauryl sulphate 47–48%, acidity 0.9% expressed as sulphuric acid.

*Example 4*

To the obtained mixture, as in Example 1, by the action of 100% sulphuric acid on 1 mol of acetone cyanhydrin, there were added 54 g. of water (3 mols), 233 g. (0.9 mol) of technical stearic alcohol (this alcohol is a mixture composed of about 40% n-hexadecanol and 60% n-octadecanol, of an average molecular weight equal to 259) and 0.1 g. of hydroquinone. The mixture was heated for 4 hours at 115–120° C., while stirring. The hot mixture was then decanted to collect 295 g. of supernatant organic phase, which contained, by weight, 88.5% stearyl methacrylate (of molecular weight equal to 327), 3.5% methacrylic acid and about 7% stearic alcohol. There was thus collected in this phase 80% of the initial acetone cyanhydrin in the form of stearyl methacrylate and 12% in the form of methacrylic acid. Nearly 98% of the alcohol, by weight, was in this phase in the free or esterified state.

The crude ester was mixed afterwards with 12 g. of 100% sulphuric acid. The mixture was heated for 1 hour at 60° C., then stirred with 400 g. of an aqueous solution containing 40% ethanol. After a second washing with 100 g. of the same solvent and the elimination by distillation of the ethanol retained in the washed ester, 280 g. of stearyl methacrylate having a purity of 94–97% were obtained.

The invention is not limited to the preferred embodiments but may be otherwise embodied or practiced within the scope of the following claims.

We claim:
1. The process of separating methacrylates of heavy aliphatic alcohols containing from 8 to 18 carbon atoms from their mixtures with the corresponding heavy alcohols, which comprises adding concentrated sulphuric acid to said mixture and heating it to convert the heavy alcohol to heavy alcohol acid sulphate, separating the mixture into a sulphuric aqueous phase and an organic phase, the organic phase containing heavy alcohol methacrylate and heavy alcohol acid sulphate, and washing the organic phase with an aqueous solution of an organic solvent miscible with water which dissolves the heavy alcohol acid sulphate but in which the heavy alcohol methacrylate is nearly insoluble.

2. The process of making methacrylates of heavy aliphatic alcohols, which comprises, in a first step, reacting primary heavy aliphatic alcohol containing from 8 to 18 carbon atoms and water with a crude solution of methacrylamide obtained by reacting acetone cyanhydrin and sulphuric acid, thereby forming heavy alcohol methacrylate, free methacrylic acid and ammonium sulphate, separating the mixture into an organic phase containing heavy alcohol methacrylate, methacrylic acid and non-transformed heavy alcohol and an aqueous phase containing sulphuric acid and ammonium sulphate, then, in a second step, mixing the organic phase with concentrated sulphuric acid and heating the mixture, thereby reacting the free methacrylic acid and heavy alcohol to form heavy alcohol methacrylate and heavy alcohol acid sulphate, and, in a third step, separating an organic phase containing the heavy alcohol methacrylate and heavy alcohol acid sulphate and washing it with an aqueous solution of an organic solvent miscible with water which dissolves the heavy alcohol acid sulphate but in which the heavy alcohol methacrylate is nearly insoluble.

3. The process of making lauryl methacrylate, which comprises, in a first step, reacting lauryl alcohol and water with a crude solution of methacrylamide obtained by reacting acetone cyanhydrin and sulphuric acid, thereby forming lauryl methacrylate, free methacrylic acid and ammonium sulphate, separating the mixture into an organic phase containing lauryl methacrylate, methacrylic acid and non-transformed lauryl alcohol and an aqueous phase containing sulphuric acid and ammonium sulphate, then, in a second step, mixing the organic phase with concentrated sulphuric acid and heating the mixture, thereby reacting the free methacrylic acid and lauryl alcohol to form lauryl methacrylate and lauryl acid sulphate, and, in a third step, separating an organic phase containing the lauryl methacrylate and lauryl acid sulphate and washing it with an aqueous solution of an organic solvent miscible with water which dissolves the lauryl acid sulphate but in which the lauryl methacrylate is nearly insoluble.

4. The process of making stearyl methtacrylate, which comprises, in a first step, reacting stearyl alcohol and water with a crude solution of methacrylamide obtained by reacting acetone cyanhydrin and sulphuric acid, thereby forming stearyl methacrylate, free methacrylic acid and ammonium sulphate, separating the mixture into an organic phase containing stearyl methacrylate, methacrylic acid and non-transformed stearyl alcohol and an aqueous phase containing sulphuric acid and ammonium sulphate, then, in a second step, mixing the organic phase with concentrated sulphuric acid and heating the mixture, thereby reacting the free methacrylic acid and stearyl alcohol to form stearyl methacrylate and stearyl acid sulphate, and, in a third step, separating an organic phase containing the stearyl methacrylate and stearyl acid sulphate and washing it with an aqueous solution of an organic solvent miscible with water which dissolves the stearyl acid sulphate but in which the stearyl methacrylate is nearly insoluble.

5. A process according to claim 2, wherein, in the first step, there are used from 0.75 to 1.5 mols of heavy alcohol and from 2 to 7 mols of water for each mol of initial acetone cyanhydrin.

6. A process according to claim 1, wherein the molar amount of concentrated sulphuric acid corresponds substantially to the molar amount of heavy alcohol present.

7. A process according to claim 1, wherein the organic solvent is acetone.

8. A process according to claim 1, wherein the organic solvent is an alcohol containing from 1 to 3 carbon atoms.

9. A process according to claim 1, wherein the aqueous solution of organic solvent contains from 20 to 50% by weight of the organic solvent.

10. A process according to claim 1, wherein the amount of aqueous solution of an organic solvent is from 0.5 to 3 times the weight of the organic phase.

No references cited.